F. W. ROWE.
Car-Couplings.

No. 155,892.                              Patented Oct. 13, 1874.

UNITED STATES PATENT OFFICE.

FRANK W. ROWE, OF HARDWICK, VERMONT.

IMPROVEMENT IN CAR-COUPLINGS.

Specification forming part of Letters Patent No. 155,892, dated October 13, 1874; application filed July 25, 1874.

*To all whom it may concern:*

Figure 1:
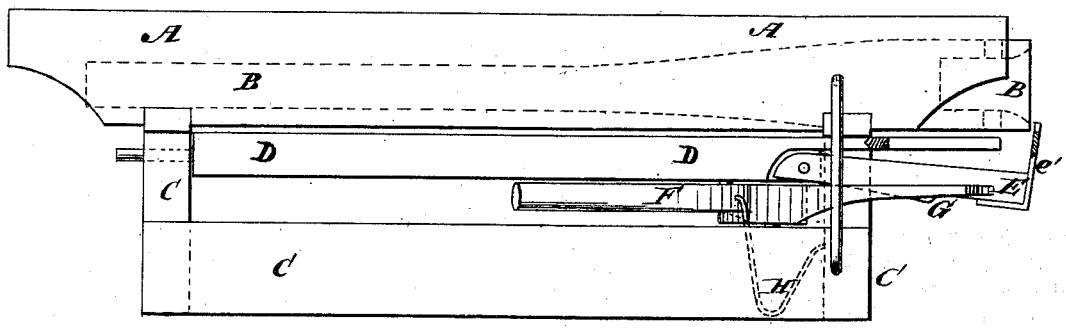
Figure 2:
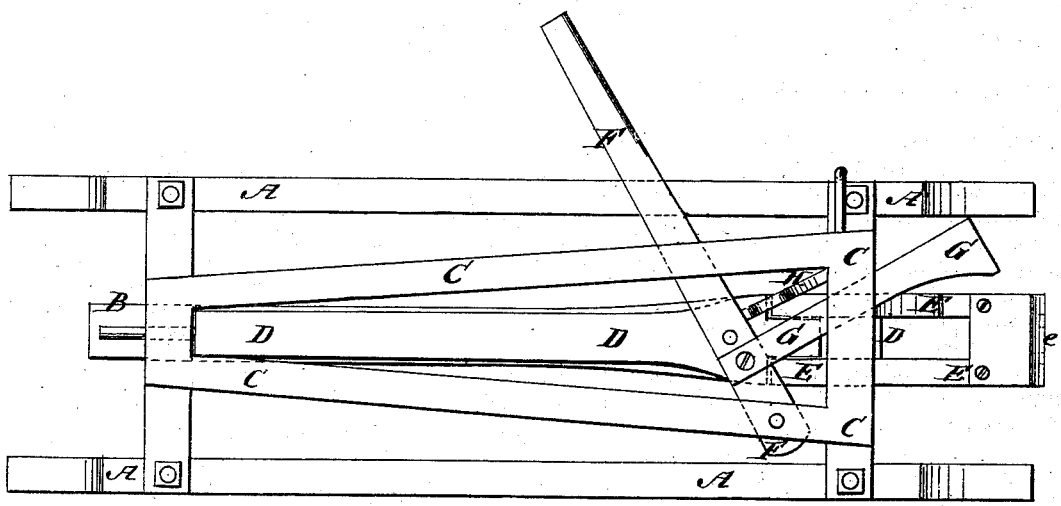
Figure 3:
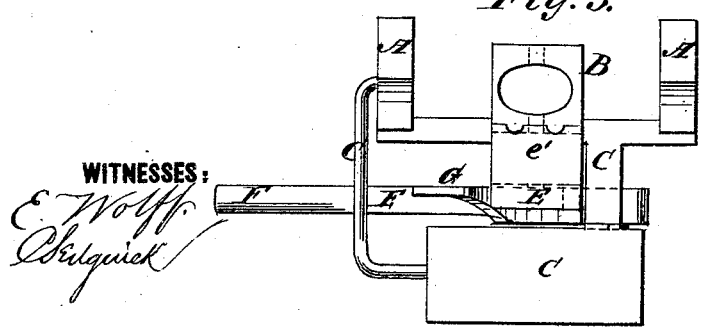

Be it known that I, FRANK W. ROWE, of Hardwick, in the county of Caledonia and State of Vermont, have invented a new and useful Improvement in Car-Couplings, of which the following is a specification:

Figure 1 is a side view of my improved device, shown as applied to the draw-bar and frame of a car. Fig. 2 is an under-side view of the same. Fig. 3 is a front view of the same.

Similar letters of reference indicate corresponding parts.

My invention has for its object to furnish an improved device for attachment to cars provided with the ordinary link-and-pin coupling, to enable them to be coupled without its being necessary to go between the cars to raise and guide the link as the cars are being run together to be coupled.

The invention consists in the combination of the frame, the bar, the hinged and flanged block, the lever, the arm, and the spring with the frame and draw-bar of a car, as hereinafter fully described.

A represents the frame, and B the draw-bar, of a car. C is a frame, placed a little below, and with its forward end a little in the rear, of the head of the draw-bar B. D is a bar, placed directly beneath the draw-bar B, and connected with the frame C, in such a way that it will have a slight longitudinal movement. The forward end of the bar D is slotted, so that it may not interfere with the coupling-pin. The under side of the forward end of the bar D is recessed to receive a block or plate, E, the inner end of which is hinged to the said bar D, and which is slotted, so that it may not interfere with the coupling-pin. The forward end of the plate E projects, so as to be flush with, or a little in advance of, the head of the draw-bar B, and has an upwardly-projecting flange, e', the upper edge of which has two notches formed in it to receive the link, so that the link may be raised into a horizontal position by raising the forward end of the block E. F is a lever, which crosses and is pivoted to the forward part of the bar D, and its inner end is pivoted to a side bar of the frame C. The other end of the lever F projects, so that it may be reached and operated by the attendant from the side of the car. To the lever F is attached an arm, G, which projects forward into such a position that, when the free end of the lever F is moved forward, the said arm may pass in beneath the hinged block E, and raise its forward end to raise the link into a horizontal position. With the lever F and frame C is connected a coiled or other spring, H, which, when the lever F is released, forces the said lever back, withdrawing the arm G, and allowing the flanged block E to drop away from the link and the head of the draw-bar B.

Having thus described my invention, I claim as new and desire to secure by Letters Patent—

The combination of the frame C, bar D, hinged and flanged block E e', lever F, arm G, and spring H with the frame and draw-bar of a car, substantially as shown and described.

FRANK W. ROWE.

Witnesses:
HENRY PERLEY,
LYMAN D. HATHAWAY.